US006779185B1

(12) United States Patent
Roukbi et al.

(10) Patent No.: US 6,779,185 B1
(45) Date of Patent: Aug. 17, 2004

(54) BLUETOOTH MINIPORT DRIVER MODEL

(75) Inventors: Husni Roukbi, Seattle, WA (US); Louis J. Giliberto, Redmond, WA (US); Doron J. Holan, Seattle, WA (US); Kenneth D. Ray, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 576 days.

(21) Appl. No.: 09/587,749

(22) Filed: Jun. 5, 2000

Related U.S. Application Data

(63) Continuation-in-part of application No. 09/556,568, filed on Apr. 24, 2000.

(51) Int. Cl.$^7$ .............................. G06F 3/00; G06F 9/44; G06F 9/46; G06F 13/00
(52) U.S. Cl. ..................................... 719/321; 719/327
(58) Field of Search ................................ 709/321, 327

(56) References Cited

U.S. PATENT DOCUMENTS 6,219,707 B1 * 4/2001 Gooderum et al. .......... 709/225
6,470,397 B1 * 10/2002 Shah et al. .................. 709/250

OTHER PUBLICATIONS

Tomlinson, Plug and Play, Windows Developer's Journal, Dec. 1995, pp. 1–6.*
Microsoft, Plug and Play for Windows NT 5.0, 1997, pp. 1–14.*
Cant, Windows Driver Model (WDM) Device Drivers, EXE Magazine, Jan. 1999.*
Udell, Windows NT Up Close: An in–depth look at Microsoft's next–generation operating system, 1996, McGraw–Hill.*
Specification of the Bluetooth System, v.1.0B, Dec. 1, 1999.
Riku Mettala et al., Bluetooth Protocol Architecture (White Paper), v1.0, Nokia Mobile Phones, Sep. 29, 1999.
Brent Miller et al., Mapping Salutation Architecture APIs to Bluetooth Service Discovery Layer (White Paper), v. 1.0, IBM Corporation, Jul. 1, 1999.
IEEE Standard, 802.11, Part 11: Wireless LAN Medium Access Control (MAC) and Physical Layer (PHY) Specifications, 1$^{st}$ Ed. 1999, and Supplements 802.11a–1999 and 802.11b–1999.
Bob O'Hara and Al Petrick, IEEE 802.11 Handbook A Designer's Companion, Dec. 1999.
Pat Megowan et al., IrDA Object Exchange Protocol, v1.2, Counterpoint Systems Foundry, Inc. Microsoft Corporation, Mar. 18, 1999.
Universal Plug and Play Device Architecture, v1.0, Microsoft Corporation, Jun. 8, 2000.
Golden G. Richard III, "Service Advertisement and Discovery: Enabling Universal Device Cooperation," http://computer.org/internet/, Sep.–Oct. 2000.
ETSI TS 101 369 v7.1.0 (Nov. 1999), Digital Cellular Telecommunications System (Phase 2+); Terminal Equipment to Mobile Station (TE–MS) Multiplexer Protocol, Global System for Mobile Communications (GSM 07.10 v7.1.0 Release 1998).

* cited by examiner

Primary Examiner—Meng-Al T. An
Assistant Examiner—Diem Cao
(74) Attorney, Agent, or Firm—Leydig, Voit & Mayer, Ltd.

(57) ABSTRACT

A system and method of Bluetooth compliant architecture and communication uses a miniport driver structure to efficiently implement the Bluetooth protocol layers, while allowing simple communication with underlying hardware.

20 Claims, 8 Drawing Sheets

BLUETOOTH MINIPORT DRIVER MODEL

CROSS-REFERENCE TO RELATED APPLICATIONS

This application is a continuation in part of, and claims benefit of, U.S. application Ser. No. 09/556,568, "Bluetooth Miniport Driver Model", filed on Apr. 24, 2000 which is hereby incorporated by reference in its entirety.

TECHNICAL FIELD

This invention relates generally to wireless interface technology and, more particularly, relates to the interface between computer software applications and wireless devices operating in accordance with the Bluetooth specification.

BACKGROUND OF THE INVENTION

Generally, computers and other electronic devices are interconnected via physical cables or wires. These communication paths allow for the exchange of data or control information between such devices. However, it is increasingly recognized that certain advantages arise from the elimination of cables and wires to interconnect devices. Such advantages include ease of configuration and reconfiguration, due to the elimination of the need to physically add, remove, or displace a physical medium. Furthermore, space which would traditionally be used for device interconnection media may be given to other uses. Furthermore, device mobility is increased through the use of wireless connections.

One method for providing wireless connections between devices employs a light wave in the Infrared region of the electromagnetic spectrum to link devices. The IrDA (Infrared Data Association) protocol defines one such connection mechanism. Unfortunately, such a mechanism must usually operate in a line of sight manner. That is to say that any opaque obstruction between transmitter and receiver will prevent proper operation. Additionally, IR transmitters are typically not omnidirectional when incorporated into a communicating device, so that for proper operation, the transmitter must be pointed generally in the direction of the receiver, within some nominal deviation such as 30 degrees. Finally, IR transmitters are typically fairly low power devices, and accordingly the range of IR links is usually limited to approximately one meter.

Radio frequency links solve many of the problems inherent in Infrared links, however, many shortcomings remain. One protocol which defines communication between wireless devices through radio frequency links is the Bluetooth specification. Still, within Bluetooth many protocol layers must be implemented. An architecture is needed whereby the layers of Bluetooth are implemented in an efficient manner while retaining a logical degree of componentization. Furthermore, this architecture should not have a negative effect on the operating system as a whole, and should permit vendor permutations of standard hardware without causing faults in the system.

SUMMARY OF THE INVENTION

Accordingly, the present invention provides an architecture system for implementing the protocol layers of the Bluetooth specification in a modular manner using a miniport construction. This allows for efficient communication while preserving the necessary degree of componentization. Furthermore, the architecture system according to an embodiment of the invention allows a hardware manufacturer to add vendor-specific commands without rewriting the port or miniport driver.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
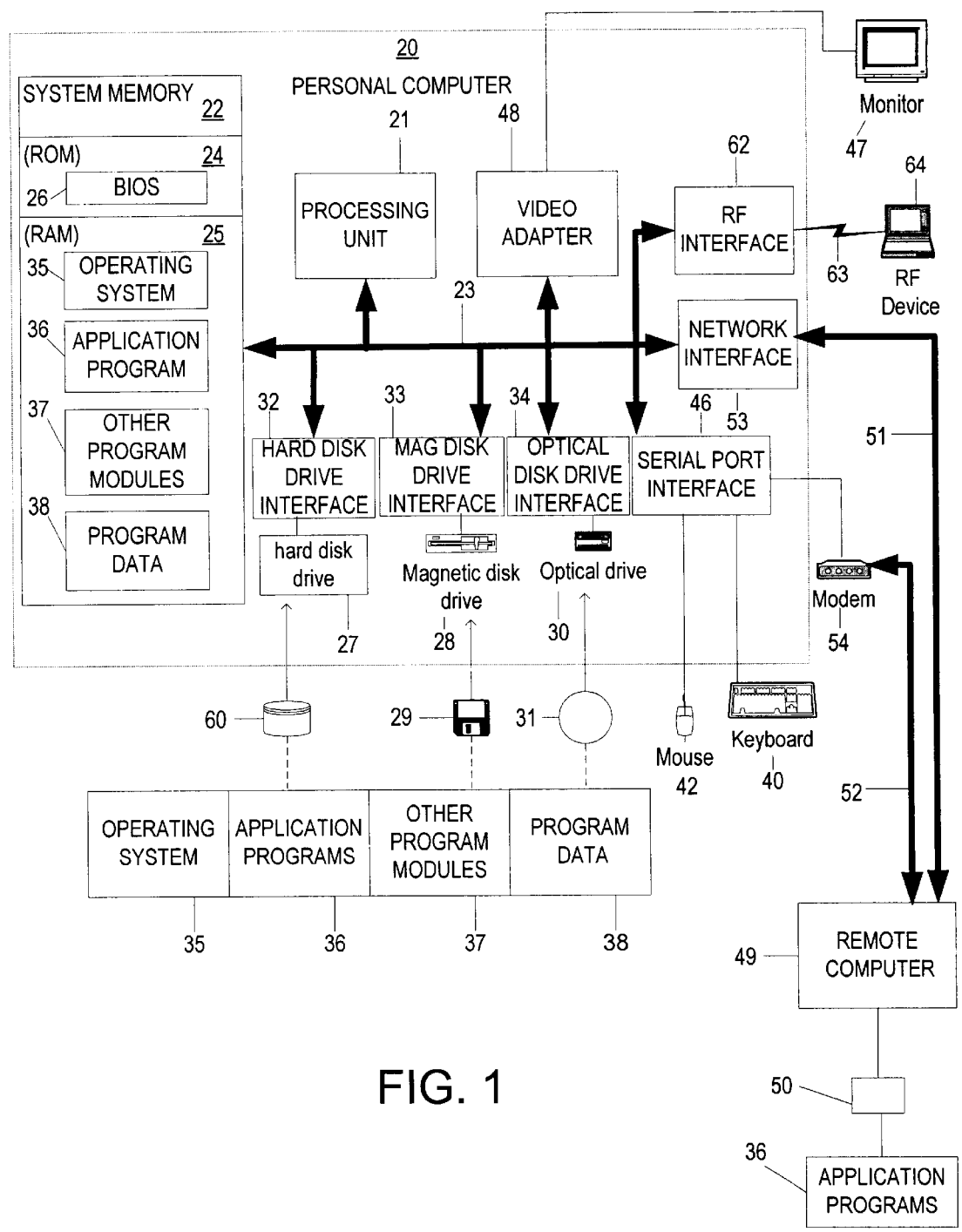
FIG. 1 is a block diagram generally illustrating an exemplary computer system on which the present invention may reside.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic roudnes that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers or devices, such as a remote computer 49 or RF device 64. The remote computer 49 may be another personal computer, a server, a router, a network PC, a peer device or other common network node, and typically includes many or all of the elements described above relative to the personal computer 20, although only a memory storage device 50 has been illustrated in FIG. 1. The Radio Frequency (RF) device 64 can be a cellular phone, digital camera, another personal computer, or other device which includes the capability to communicate through the RF spectrum. The logical connections depicted in FIG. 1 include a local area network (LAN) 51 and a wide area network (WAN) 52, and an RF connection 63. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. When used in conjunction with an RF connection 63, the personal computer 20 includes an RF interface 62. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Figure 2:
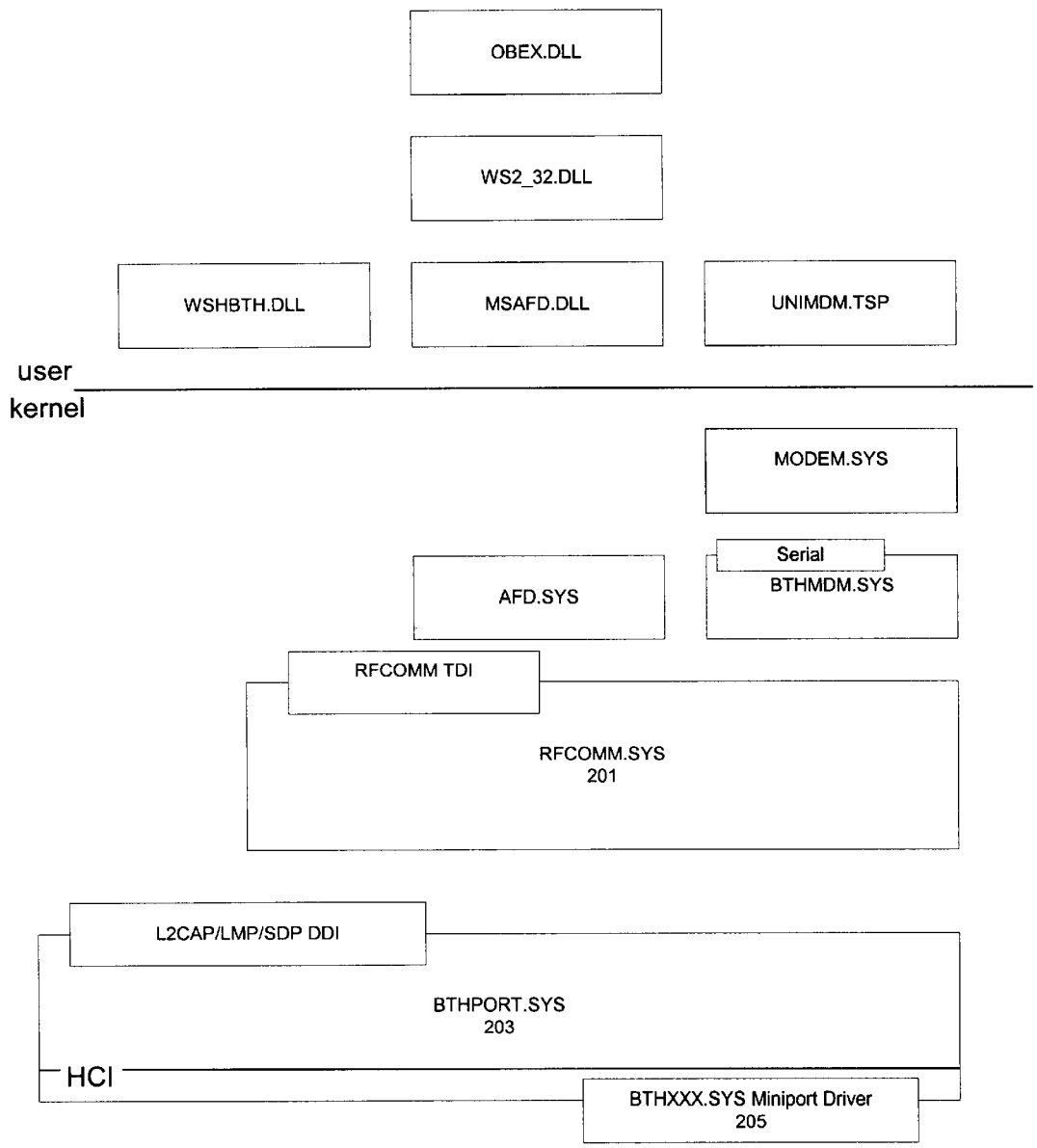
FIG. 2 is an architectural diagram of various system components according to an embodiment of the invention.

The "Specification of the Bluetooth System" Version 1.0B (Dec. 1, 1999) is incorporated herein by reference in its entirety. The presentation "Windows Wireless Architecture" is attached at Appendix A, the presentation "Bluetooth Architecture Overview" is attached at Appendix B, the presentation "Bluetooth Experience in Windows" is attached at Appendix C, and the presentation "Bluetooth Stack in Windows" is attached at Appendix D. Attached as Appendix E is the white paper "Remote NDIS Over Bluetooth Specification," Mar. 20, 2000, copyright Microsoft Corporation. These presentations and this white paper provide further information regarding the Bluetooth specification. With reference to the architectural diagram of FIG. 2, in order to implement the L2CAP, HCI, LMP, SDP, and various Transport protocols in a port/miniport model, the following components are used: RFCOMM.SYS (the Bluetooth RFCOMM driver) 201; BTHPORT.SYS (the Bluetooth port driver, which is related to a class of devices) 203; BTHSER.SYS (the Bluetooth RS-232 Transport and UART Transport miniport driver); BTHUSB.SYS (the Bluetooth USB transport driver); BTHXXXX.SYS (the miniport drivers, which may be statically linked against the port driver; alternatively, as one of skill in the art will appreciate, a miniport driver which is not statically linked against the port driver is dynamically linked. The miniport drivers are related to a specific device or devices.) 205; PnP (the "Plug'N'Play" system); and Power (Microsoft brand WINDOWS operating system power management system). As one of skill in the art will know, the Plug'N'Play system is a combination of hardware and software support that enables a computer system to recognize and adapt to hardware configuration changes with little or no user intervention. The power management system is a system for managing the power consumption in a PC running the Microsoft brand WINDOWS operating system.

Within the invention, it is desirable to implement most of the protocol functionality within a single software entity. Exemplary of this, as seen from FIG. 2, the L2CAP, HCI, LMP, and SDP layers are advantageously implemented within a single module, BTHPORT.SYS. This allows the greatest efficiency in communicating between the protocol layers. One of skill in the art will appreciate that additional protocols may also be implemented within the same entity or that certain of the listed protocols may be implemented elsewhere such as in hardware when preferred in view of the Bluetooth Specification. See for example, page 205 of "Specification of the Bluetooth System" Version 1.0B (Dec. 1,1999). Thus, again by way of example, the LMP layer may alternatively be implemented in the hardware itself or elsewhere on the host PC. The transport layer is implemented in the miniport driver 205 on a transport and/or device-specific basis. The BTHPORT.SYS driver 203 and the BTHXXXX.SYS miniport driver 205 communicate via the BTHPORT device driver interface (DDI). This interface is a well-known set of methods and data structures which allows communication with the transport method and Bluetooth hardware to be abstracted from the protocols above.

Figure 3:
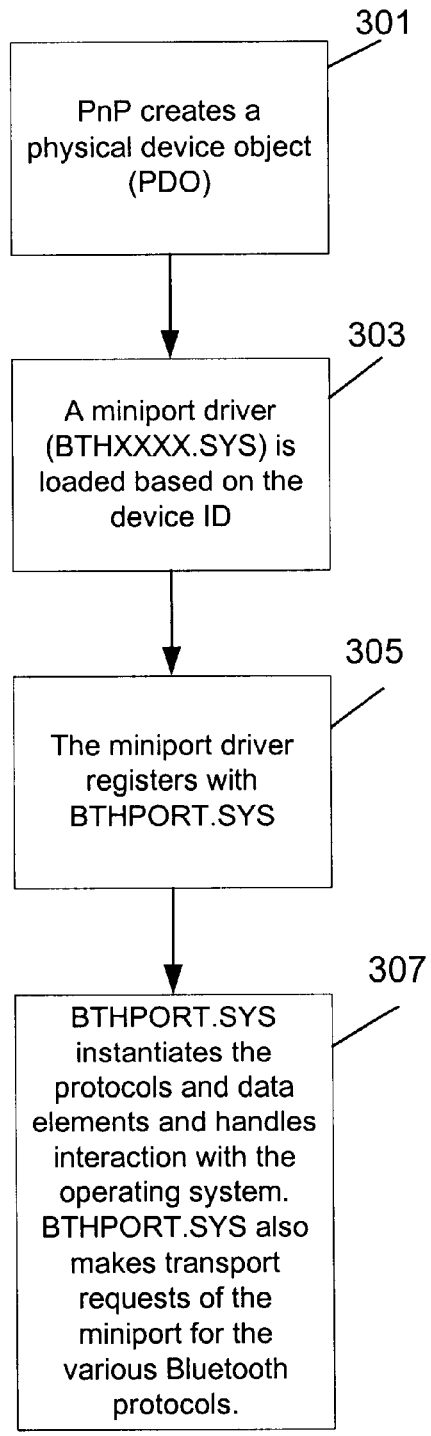
FIG. 3 is a flow chart of steps taken during miniport driver registration in an embodiment of the invention.

With reference to the steps of the flow chart of FIG. 3, in step 301 when a new Bluetooth device arrives, PnP creates a physical device object (PDO) with an ID for the device. The PnP system looks up this ID and in step 303 loads an appropriate miniport driver for it. The miniport driver then registers with the BTHPORT port driver in step 305. If BTHPORT is already loaded at this time, for example by virtue of being already associated with another device, then it need not be reloaded. Rather, BTHPORT may simply augment an appropriate counter or such to reflect the additional device to be supported. Finally, in step 307 BTHPORT.SYS instantiates the protocols and data path through the protocols. BTHPORT.SYS further handles interaction with the operating system (i.e. PnP requests, power requests, etc.) as much as possible with minimal reliance on the miniport driver (although it may ask it to perform specific tasks). Furthermore, the miniport driver knows how to send and receive packets for the transport/hardware it was written for.

Local clients may be associated through BTHPORT as the need arises, depending upon the services required. For example, it may be necessary to support file transfer, headphone set functionality, a DUN connection, and so on. RFCOMM 201 is an example of a client that is loaded in this manner. Multiple clients may be associated with a single device. This is a result of classifying a device as a conglomeration of services rather than as a singular entity. As discussed above, service discovery may be by way of the SDP (Service Discovery Protocol) as outlined in the "Specification of the Bluetooth System" Version 1.0B (Dec. 1, 1999). In certain cases, such as with RFCOMM, it may be desirable to have a certain portion or portions of a service or client loaded, and to load other portions only when the need arises. In some instances, a required client may already exist due to a recent connection by a device requiring the same service.

Figure 7:
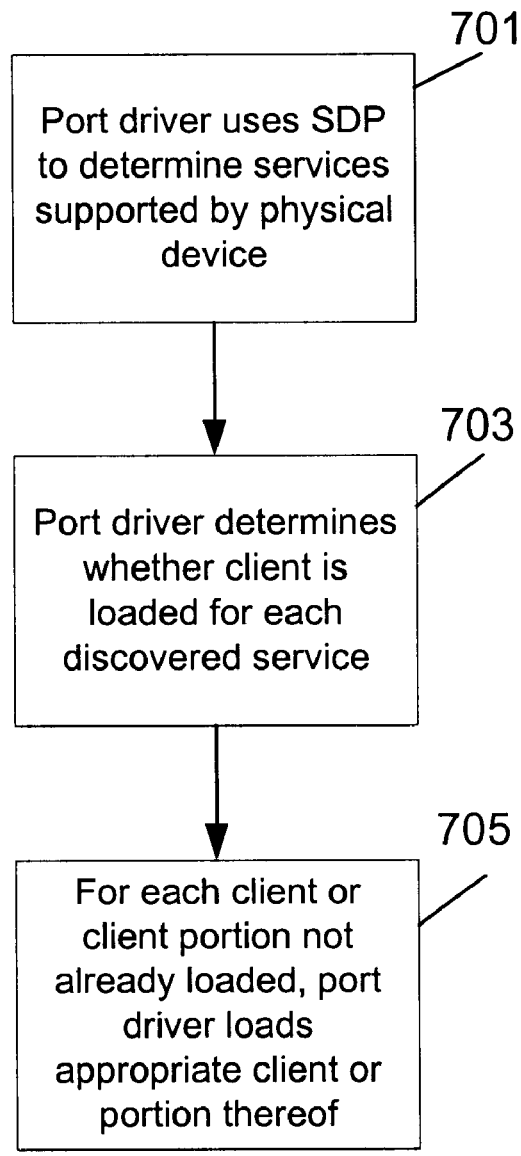
FIG. 7 is a flowchart illustrating the steps taken to facilitate dynamic loading of clients for a device.

The steps taken to associate appropriate clients with a device may be encompassed within step 307 of FIG. 3, and are illustrated in greater detail in FIG. 7. In step 701, the port driver 203 uses the SDP to determine what services are supported by the physical device. In step 703, the port driver 203 determines whether a client exists for each discovered service. In step 705, for each client or client portion that is not already loaded, the port driver loads the appropriate client or portion thereof. Handling client loading in this manner is appropriate and advantageous in a system such as the present where mobility is enhanced and connections are accordingly somewhat less predictable.

Figure 4:
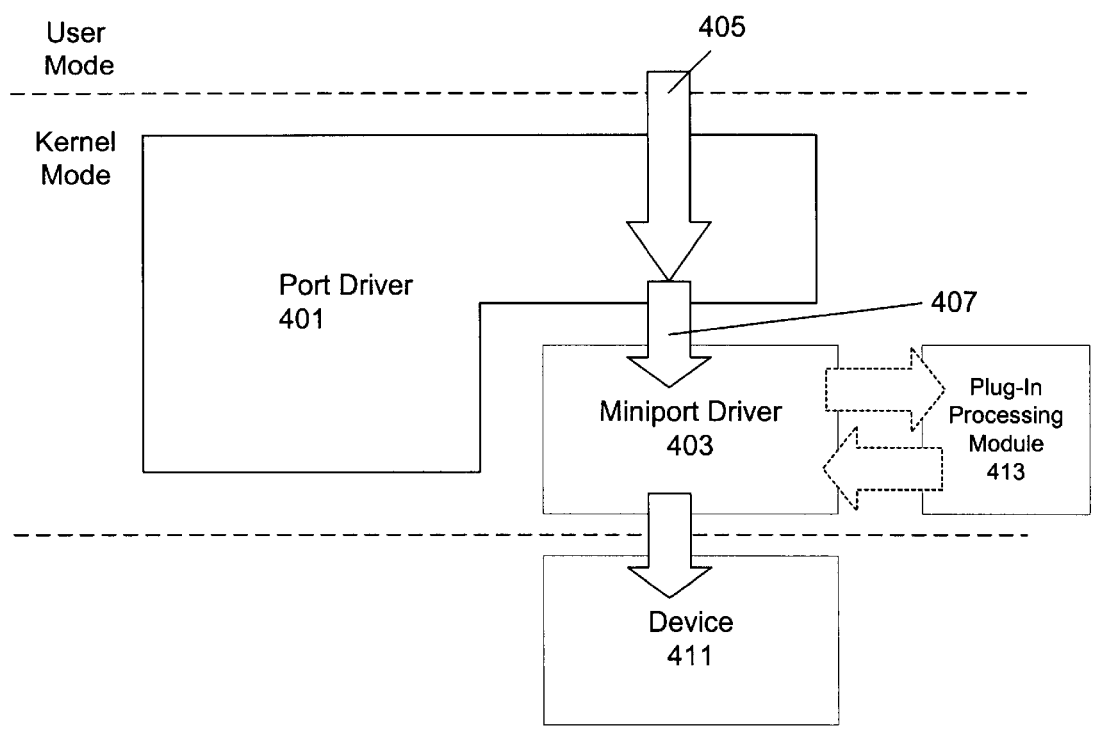
FIG. 4 is a simplified architectural diagram illustrating message passing between a port driver and miniport driver in an embodiment of the invention.
Figure 5:
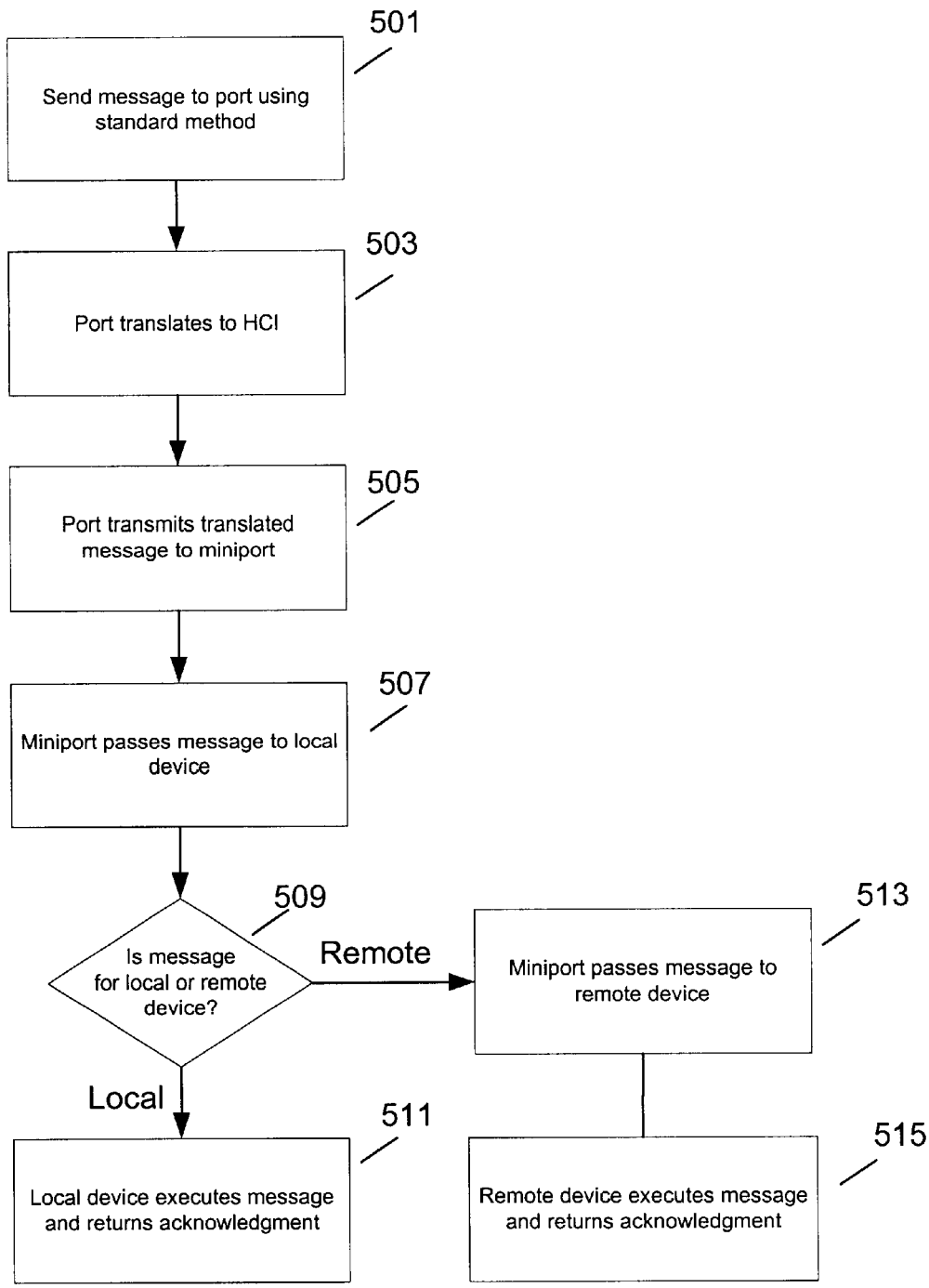
FIG. 5 is a flowchart illustrating the steps taken during passage of a message from user mode in an embodiment of the invention.

To enhance the viability of the port/miniport model, it is desirable to have a standard method for delivering information between user space and the miniport driver for application by a device. Accordingly, in an embodiment of the invention the Bluetooth protocol stack may communicate with the underlying hardware without requiring the writing of additional code and without requiring the rewriting of drivers, enabling the communication of vendor-specific commands which may be outside of the Bluetooth specification. FIG. 4 illustrates in a simplified fashion the port driver 401 and miniport driver 403, as they relate to this embodiment. With reference to the elements of FIG. 4 and the steps of FIG. 5, when information is to be transmitted from user mode to the miniport driver 403 for eventual transmission or application to a device 411, it is first transmitted to the port driver 401 using a standard method in step 501 via message 405. For example, the requester may send a Bluetooth request Block (BRB) to the port driver 401. A BRB is simply a block of information conveyed to the port driver via 10 Request Packets (IRPs) or any other appropriate I/O request conveyance mechanism. The BRB has the vendor specific function type set and contains the data to be sent to the miniport driver 403 or hardware 411. This method requires a kernel mode driver. Alternatively, the requester may send the vendor specific device i/o control request (IOCTL) to the port driver 401. The IOCTL's input buffers contain the data to be sent to the miniport driver 403 or hardware 411. This may be implemented in either kernel or user mode. Finally, the requester may alternatively send the vendor specific command via a WMI request.

The request's input buffer could contain the data to be sent to the miniport driver 403 or hardware 411. There is preferably a specific GUID defined for the command. This may be implemented in user mode.

Subsequently, the message 405 is translated by the port driver 401 in step 503 from the standard format to a format appropriate for the miniport driver 403. The translated message 407 is preferably compliant with the HCI (Host Controller Interface) standard set forth in "Specification of the Bluetooth System" Version 1.0B (Dec. 1, 1999). The translated message preferably takes the form of HCI__unknown__CMD, with an acknowledgment of HCI__unknown__EVENT. An example of such a message is an HCI__UNKNOWN__CMD with a hardware-specific value of "LED__ON" to light an LED on a device, and an acknowledgement of HCI__UNKNOWN__EVENT with a hardware-specific value of "LED__ON" to acknowledge this command. The protocol and interface between the miniport driver 403 and device 411 is preferably standardized to minimize the number of miniport drivers needed, such that hardware vendors with knowledge of the protocol and interface may use the methods disclosed herein to pipe messages from user mode to the miniport driver 403 and device 411. The translated message 407 is sent to the miniport driver 403 in step 505. In turn in this embodiment, the miniport driver 403 passes the translated message 407 to the local device 411 in step 507.

In step 509, the miniport driver 403 determines whether the message is for the local or remote device. In the former case, the local device 411 receives the message and executes the requested function and transmits an acknowledgement upstream in step 511. Otherwise, in step 513 the local device 411 is given the message by the miniport driver 403 and transmits the message to the remote device, not shown, which executes the requested function and transmits an acknowledgement in step 515 to the local device 411 for transmission upstream.

Figure 6:
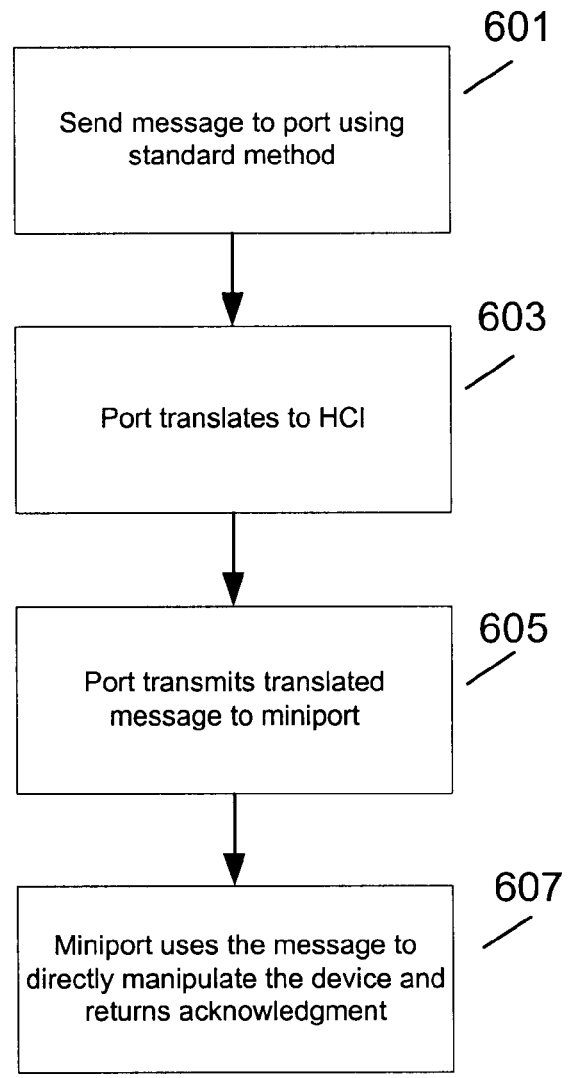
FIG. 6 is a flowchart illustrating the steps taken during passage of a message from user mode in an alternative embodiment of the invention.

In a further embodiment, the message 405 may be intended for use by the miniport driver rather than the device or devices. In this embodiment, the miniport driver is adapted to interpret the message 407 rather than simply passing it downstream. The steps according to this embodiment are illustrated in FIG. 6. Steps 601, 603, and 605 correspond to steps 501, 503, and 505 of FIG. 5. However, in step 607, the miniport driver 403 uses the message to directly manipulate the device 411 rather than passing the message along and relying on the device 411 to perform the necessary function. Such direct manipulation may be by writing to a register, sending a USB command, etc. The miniport driver 403 also generates and returns an acknowledgment in step 507. Accordingly, in this embodiment, the device 411 need not to be able to understand the message 407.

The port driver may use various methods to route the possible response. In a first embodiment a kernel mode component sends a query interface to the port driver. The query interface request contains a direct call function that will be called when an unknown HCI event occurs in the port driver. Alternatively, the query interface request can contain an event ID which can limit the events for which the direct call function will be called. This may be implemented as a response to any of the three ways to send a request discussed above.

Alternatively, for each unknown HCI event, the port driver can fire a WMI event. A user mode component can then listen for the event and respond to it appropriately. This may be implemented as a response to any of the three ways to send a request discussed above, although it is best suited for the WMI method of sending as request.

In an alternative embodiment, additional processing of information passing to or from the device 411 may be executed externally to the miniport driver 403. In particular, a plug-in module 413 is provided in this embodiment for executing additional processing of the message 407 before passage to the device, or of a message from the device 411 to the miniport 403 before passage to higher layers. Examples of processing performable by such a plug-in processing module are LMP layer emulation and processing of proprietary packet headers and trailers, etc. This architecture allows for additional value to be added in a manner that is substantially transparent to the Bluetooth protocols. In one aspect of this embodiment, the plug-in processing module 413 may also be used by the miniport driver 403 to process information that does not get passed on to the device 411. This may occur for instance where a particular operation or transformation is performable by the plug-in processing module 413 without the aid of the device 411.

In the Bluetooth Specification, each hardware interface is described with a transport protocol, however it is possible that different hardware vendors will choose, for various reasons, to utilize different transport protocols. Thus, in a further alternative embodiment, the miniport driver 403 is comprised of two components, a Bluetooth Transport Protocol Driver (Protocol Driver) and a Bluetooth Hardware Interface Driver (Hardware Driver). Separating the miniport 403 into two components in this manner allows the implementation of any hardware interface with any transport protocol allowing flexibility, driver reuse, and all associated economies and benefits. This architecture provides further benefits to hardware vendors by allowing them to create "controller-less" Bluetooth devices. For example, in a system wherein the port driver does not implement the LMP layer, a vendor may nevertheless choose to run LMP on the PC by implementing the protocol in the Protocol Driver component of the minidriver.

In greater detail with respect to the above-described componentization of the minidriver 403, the Protocol Driver and Hardware Driver are communicably associated, with the Protocol Driver presenting a Bluetooth miniport driver interface to higher layers. The Protocol Driver implements the appropriate protocols to send and receive data to and from the Bluetooth hardware. The lower edge of this driver may be IRP-based, and communicates with the Hardware Driver. Alternatively, a statically or dynamically linked library may be implemented which shields the protocol code from the fact that communication with the Hardware Driver is IRP-based.

The Hardware Driver is implemented to communicate with the Bluetooth hardware in a standard WDM Driver manner. The upper edge of the Hardware Driver communicates with the Protocol Driver in a standard IRP-based manner. Alternatively, a statically or dynamically linked library may be implemented which shields the hardware code from the fact that communication with the Protocol Driver is IRP-based.

Figure 8:
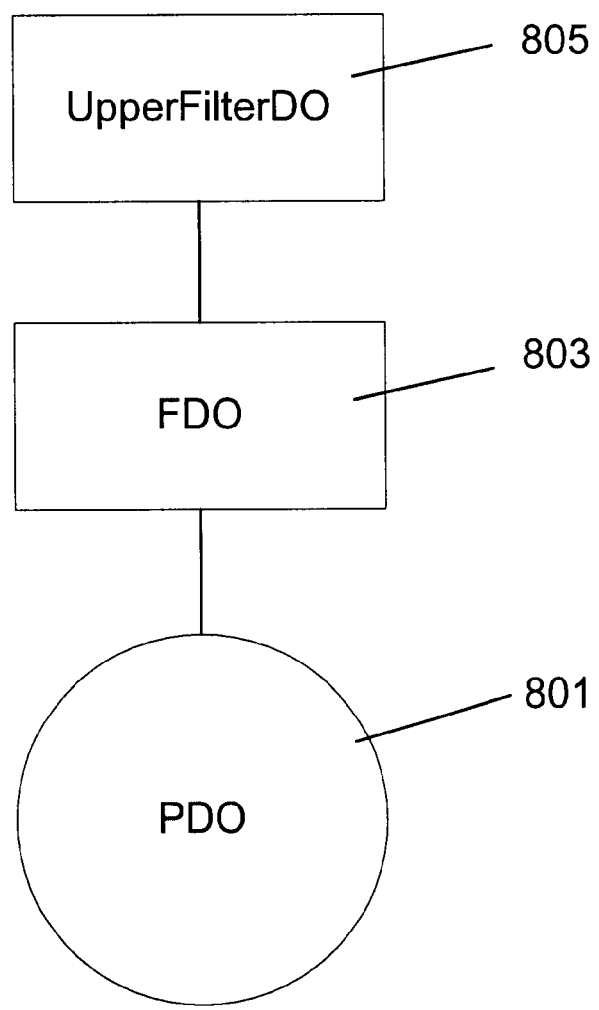
FIG. 8 is a block diagram showing the loading of a protocol driver and a hardware driver according to an embodiment of the invention.

The Protocol Driver and Hardware Driver may be loaded as illustrated in FIG. 8. In particular, when a low-level bus enumerates a Bluetooth radio attached to the PC, the underlying bus, through the use of PnP, creates a FDO 801 for this device which has an ID associated with it. The drivers are then loaded by PnP in the standard manner, wherein the PnP system locates the appropriate INF based on this ID and loads the appropriate drivers as function, filter, etc. based on the instructions in the INF. The Hardware Driver is designated as the Functional Driver (associated with FDO 803) while the Protocol Driver is designated as the Upper Filter Driver (associated with UpperFilterDO 805). In this manner, the described alternative embodiment may be effectively implemented.

All of the references cited herein, including patents, patent applications, and publications, are hereby incorporated in their entireties by reference. In view of the many possible embodiments to which the principles of this invention may be applied, it should be recognized that the embodiments described herein with respect to the drawing figures are meant to be illustrative only and should not be taken as limiting the scope of the invention. For example, those of skill in the art will recognize that the elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

We claim:

1. A computer system implementing the Bluetooth specification comprising:

a device or transport specific miniport driver for determining whether function requests are to be executed on a local physical device or a remote device, and for transmitting said function requests to the local physical device, wherein said function requests call for either execution by the local physical device or subsequent transmission from the local physical device to and execution by the remote device if intended for the remote device; and a Bluetooth port driver module communicably linked to the miniport driver.

2. The system according to claim 1, wherein the Bluetooth port driver module comprises:

a Bluetooth service discovery protocol (SDP) complaint component for implementing the SDP protocol;

a Bluetooth logical link control and adaptation protocol (L2CAP) compliant component for implementing the L2CAP protocol; and a Bluetooth host controller interface (HCI) compliant component for implementing the HCI protocol.

3. The system according to claim 2, wherein the Bluetooth port device module further comprises a Bluetooth link manager protocol (LMP) complaint component for implementing the LMP protocol.

4. The system according to claim 1, wherein the miniport driver further comprises;
   a Protocol Driver for interfacing to the Bluetooth port driver module; and
   a Hardware Driver communicably linked to the Protocol Driver for interfacing to a Bluetooth hardware device.

5. In a computer system comprising a Bluetooth port driver module and a plurality of device or transport specific miniport drivers, a method of creating a communications path to a physical device comprising the steps of:
   detecting that the physical device is connected to the computer system;
   determining a device ID associated with the device;
   loading for use a miniport driver selected as a function of the device ID from the plurality of device or transport specific miniport drivers; and
   registering the loaded miniport driver with the Bluetooth port driver module, whereby the Bluetooth port driver module is able to communicate with the physical device via the loaded miniport driver, and whereby the physical device is able to transmit function requests to a remote device such that functionality requested in the function request and determined to be executed on the remote device is executed on the remote device.

6. For use in a computer system comprising a device or transport specific miniport driver associated with a local physical device, and a Bluetooth port device module communicably linked to the miniport driver, a method of transmitting a function request from a user mode entity to the miniport driver comprising the steps of:
   transmitting a function request from the user mode entity to the Bluetooth port driver module, wherein the function request contains a request for functionality;
   translating the transmitted function request to a miniport function request in a format usable by the miniport driver;
   passing the miniport function request to the miniport driver;
   transmitting the miniport function request from the miniport driver to the local physical device;
   determining whether the miniport function request is intended for the local physical device or for a remote device; and
   if the miniport function request is intended for the remote device, transmitting the miniport function request from the local physical device to the remote device, whereby the functionality requested in the function request is executed on the remote device.

7. The method according to claim 6, wherein the miniport driver comprises a Protocol Driver and a Hardware Driver, the method further comprising the steps of:
   receiving the miniport function request at the Protocol Driver;
   passing the miniport function request from the Protocol Driver to the Hardware Driver; and
   passing the miniport function request from the Hardware Device to the local physical device.

8. The method according to claim 6, wherein the function request comprises a Bluetooth Request Block (BRB) containing vendor-specific function type information and data to be sent to the miniport driver or the local physical device.

9. The method according to claim 6, wherein the function request comprises a vendor specific device IOCTL, wherein the IOCTL's input buffers contain data to be sent to the miniport driver or the local physical device.

10. The method according to claim 6, wherein the function request comprises a vendor specific command in a WMI request to be sent to the miniport driver or the local physical device.

11. The method according to claim 6, wherein the step of translating the transmitted function request to a miniport function request further comprises the step of rendering the transmitted function request as an HCI_unknown_CMD.

12. The method according to claim 6, further comprising the step of routing a response to the function request via the Bluetooth port driver module, wherein the response is in the form of HCI_unknown_EVENT.

13. The method according to claim 12, wherein the step of routing a response to the function request via the Bluetooth port driver module further comprises the steps of:
   causing a kernel mode component to transmit a query interface request to the Bluetooth port driver module, wherein the query interface request contains a direct call function to be called when an unknown HCI event occurs in the Bluetooth port driver;
   receiving an unknown HCI event at the Bluetooth port driver module from the miniport driver; and
   calling the direct call function specified in the query interface request.

14. The method according to claim 12, wherein the step of routing a response to the function request via the Bluetooth port driver module further comprises the steps of:
   receiving an unknown HCI event at the Bluetooth port driver module from the miniport driver;
   firing a WMI event by the Bluetooth port driver module; and
   detecting the WMI event by a user mode entity.

15. The method according to claim 6, further comprising the step of:
   executing on the local physical device the functionality requested in the function request.

16. The method according to claim 6, further comprising the step of:
   executing the functionality requested in the function request via direct manipulation of the local physical device by the miniport driver responsive to the miniport function request.

17. For use in a computer system comprising a device or transport specific miniport driver associated with a local physical device, and a Bluetooth port driver module communicably linked to the miniport driver, and a remote physical device communicably linked to the local physical device, a method of executing functionality on a physical device comprising the steps of:
   transmitting a function request from a user mode entity to the Bluetooth port driver module, wherein the function request contains a request for functionality;
   translating the transmitted function request to a miniport function request in a format usably by the miniport driver;
   passing the miniport function request to the miniport driver;
   determining to which of the local and remote physical devices the function request is directed;
   if the function request is directed to the local physical device, passing the miniport function request to the local physical device, whereby the local physical device executes the functionality requested in the function request; and
   if the function request is directed to the remote physical device, passing the miniport function request to the local physical device, whereby the local physical device passes the miniport function request to the remote physical device to execute the functionality requested in the function request.

18. The method according to claim 17, further comprising the steps for associating a client for use with the local physical device:

determining by use of a Bluetooth service discovery protocol (SDP) that a service is supported by the local physical device;

determining whether a client for that service is loaded; and if the client for that service is not loaded, causing the client for that service to be loaded.

19. The method according to claim 18, wherein the step of determining whether a client is loaded further comprises the step of determining whether at least a portion of a client is loaded.

20. The method according to claim 19, wherein the step of causing a client to be loaded comprises the step of causing only those portions of the client that are not already loaded to be loaded.

* * * * *